US009393884B2

(12) United States Patent
Josten et al.

(10) Patent No.: US 9,393,884 B2
(45) Date of Patent: Jul. 19, 2016

(54) ROTARY JOINT, IN PARTICULAR FOR A VEHICLE SEAT

(71) Applicant: Johnson Controls GmbH, Burscheid (DE)

(72) Inventors: Stefan Josten, Rommerskirchen (DE); Andrej Pastorek, Banovce nad Bebravou (SK); Benjamin Ndagijimana, Köln (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 0 days.

(21) Appl. No.: 13/969,460

(22) Filed: Aug. 16, 2013

(65) Prior Publication Data

US 2013/0334859 A1 Dec. 19, 2013

Related U.S. Application Data

(63) Continuation of application No. PCT/EP2012/000621, filed on Feb. 13, 2012.

(30) Foreign Application Priority Data

Feb. 17, 2011 (DE) ........................ 10 2011 011 480

(51) Int. Cl.
*F16D 3/00* (2006.01)
*B60N 2/20* (2006.01)
(Continued)

(52) U.S. Cl.
CPC .............. *B60N 2/20* (2013.01); *B60N 2/01508* (2013.01); *B60N 2/206* (2013.01); *B60N 2/305* (2013.01);
(Continued)

(58) Field of Classification Search
CPC ............... Y10T 403/32254; Y10T 403/32606; B60N 2/01508; B60N 2/20; B60N 2/206; B60N 2/305; B60N 2/36; B60N 2/366; B60N 2/682
USPC ................. 403/83; 279/20, 63, 93; 297/378.1
See application file for complete search history.

(56) References Cited

U.S. PATENT DOCUMENTS 2,939,740 A * 6/1960 Bobek et al. .................... 296/66
6,514,146 B1 * 2/2003 Shinozuka ...................... 464/79
(Continued)

FOREIGN PATENT DOCUMENTS

CN 1300258 A 6/2001
DE 214605 10/1909
(Continued)

OTHER PUBLICATIONS

International Search Report dated May 22, 2012 as received in International Application No. PCT/EP2012/000621.
(Continued)

*Primary Examiner* — Gregory Binda
*Assistant Examiner* — Nahid Amiri
(74) *Attorney, Agent, or Firm* — Foley & Lardner LLP

(57) ABSTRACT

A rotary joint for a vehicle seat is movable between at least two positions. The rotary joint includes an outer bearing comprising two shell halves, which, when forced together by a mechanical fastener, compress a rounded space between the two shell halves. The rotary joint further includes an inner bearing held between the two shell halves and rotatable relative to the outer bearing via rotation within the shell halves. The inner bearing includes a sleeve forming the outer surface and having an elastic property to reduce non-rotational movement outer bearing and the inner bearing.

9 Claims, 6 Drawing Sheets

2 13 5 18 17 11 16′ 4 14 8 3 7 10 16 12 15 6 19 14′ 9

(51) Int. Cl.
*B60N 2/015* (2006.01)
*B60N 2/30* (2006.01)
*B60N 2/36* (2006.01)
*B60N 2/68* (2006.01)

(52) U.S. Cl.
CPC *B60N 2/36* (2013.01); *B60N 2/366* (2013.01); *B60N 2/682* (2013.01); *Y10T 403/32254* (2015.01); *Y10T 403/32606* (2015.01)

(56) References Cited

U.S. PATENT DOCUMENTS

| | | | | |
|---|---|---|---|---|
| 7,188,906 | B2 * | 3/2007 | Christoffel et al. | 297/378.13 |
| 7,775,591 | B2 * | 8/2010 | Hahn et al. | 297/341 |
| 7,775,596 | B2 * | 8/2010 | Kennedy et al. | 297/362.11 |
| 2009/0144935 | A1 * | 6/2009 | Peng et al. | 16/321 |

FOREIGN PATENT DOCUMENTS

| | | | |
|---|---|---|---|
| DE | 69 11 480 | U | 9/1970 |
| DE | 296 09 018 | U1 | 8/1996 |
| DE | 197 31 305 | A1 | 2/1999 |
| DE | 102 41 737 | A1 | 3/2004 |
| DE | 102 49 100 | A1 | 5/2004 |
| EP | 1 584 512 | A2 | 10/2005 |
| FR | 2897311 | A1 | 8/2007 |
| JP | 06-419351 | U | 1/1989 |
| JP | 05-069769 | A | 3/1993 |
| JP | 06-033544 | U | 12/1994 |
| WO | WO-2004/024504 | A1 | 3/2007 |

OTHER PUBLICATIONS

Examination Report mailed Feb. 13, 2012, as received in corresponding German Application No. 10 2011 011 480.7, 5 pages.
Office Action dated Oct. 21, 2014, in corresponding Japanese Application No. 2013-553833, 4 pages.
Office Action dated Jan. 29, 2015 in corresponding Korean application No. 10-2013-7024581, 4 pages.
Office Action dated May 6, 2015 in corresponding Chinese application No. 201280014828.1, 7 pages.
Office Action dated Oct. 30, 2015, in corresponding Korean application No. 10-2013-7024581, 3 pages.
Office Action in Chinese Application No. 201280014828.1 dated Mar. 11, 2016, 7 pages.

* cited by examiner

ROTARY JOINT, IN PARTICULAR FOR A VEHICLE SEAT

CROSS REFERENCE TO RELATED APPLICATIONS

This application claims the benefit of and priority to PCT Application No. EP2012/000621, entitled "Rotary joint, in particular for a vehicle seat," filed Feb. 13, 2012, which claims the benefit of and priority to German Pat. Appl. No. 10 2011 011 480.7, filed Feb. 17, 2011, the entireties of which are hereby incorporated by reference.

BACKGROUND

The invention relates to a rotary joint for a movably mounted component, in particular for a seat cushion of a vehicle rear seat, having at least two bearing parts rotatably mounted with respect to each other comprising two sliding surfaces facing each other. The invention further relates to a seat, in particular a vehicle seat, with at least one movably mounted seat portion, such as a seat cushion or the like, which is mounted rotatably by means of at least one rotary joint.

It is possible for example to retain the seat cushion of a seat in such manner that it is displaceable via at least one rotary joint. In particular, the seat cushions of a rear seat bench of a motor vehicle may be brought into a vertical position by means of such rotary joints in order to increase the storage space or the storage capacity inside the vehicle. For this purpose, the lower end of the seat cushion is typically attached to the backrest of the seat or to bodywork parts of a vehicle via at least one rotary joint. At the same time, irritating noises or vibrations in the rotary joints are to be avoided or unintended movement of a folded or raised seat cushion is to be prevented.

According to DE 102 49 100 A1 for example, a rotary joint for a vehicle seat is known that is operatively connected to a control device, via which a locking element arranged in the backrest section may be brought into releasable engagement with a counter bearing such that the backrest section can be fixed in its horizontal position.

In addition, a linkage particularly for seat adjustment devices having at least one bushing and a pivot bolt fitted inside the bushing rotatably and with radial play is described in DE 197 31 305 C2. In order to compensate for the play in the bushing, an axially mountable play compensation element of oversize dimensions is provided so that material parts of the compensation element are pressed into the gap in the bearing when the linkage is mounted.

According to DE 69 11 480 U a rotary joint is also known that is equipped with a blocking device comprising a receptacle with two frustoconical flanges of opposite pitch and frustoconical discs mounted inside said flanges. When the discs are moved toward each other, a clamping effect is created between the disc peripheries and the flanges of the receptacle, thereby ensuring the fixed orientation of the backrest of a vehicle seat.

Not only do the known rotary joints have a relatively complex structural configuration, but the play compensation elements known according to DE 197 31 305 C2 are also exposed to such loads in the area of the seat adjustment that a reliable function is not guaranteed for the long term.

The problem addressed by the invention is to improve a rotary joint of the species described in the preceding to such effect that any noise or vibration in the rotary joint is avoided in advantageously simple manner.

SUMMARY

The object is solved according to the invention with a rotary joint having the features of claim 1. Advantageous refinements and variations of the invention are set forth in claims 2 to 10.

One embodiment of the present disclosure relates to a rotary joint for a movably mounted component, in particular for a seat cushion of a vehicle seat, with at least two bearing parts that are mounted so as to be rotatable with respect to one another and comprise sliding surfaces that face one another. The rotary joint is characterized in that a first bearing part (3, 21) has at least two bearing shells that are positioned with a variable space therebetween (5, 6, 23, 24), by which the periphery of the second bearing part (4, 22) is at least partially enclosed, and in that at least one means for increasing the contact pressing force between the sliding surfaces (15, 16, 30, 31) of the bearing shells (5, 6, 23, 24) and the second bearing part (4, 22) is allocated to one of the bearing parts (3, 4, 21, 22).

The rotary joint may be characterized in that at least surface portions of one of the sliding surfaces (15, 16, 30, 31) of the first or second bearing part (3, 4, 21, 22) is constructed from a separate sleeve element (10, 28) with inner and outer diameters modified to match the dimensions the bearing parts (3, 4, 21, 22).

The rotary joint may further be characterized in that the sleeve element (10) is constructed from two preformed sleeve halves (11, 12). The rotary joint may further be characterized in that the sleeve halves (11, 12) are connected to one another via a hinge-like connection section.

The rotary joint may further be characterized in that the material for the sleeve element (10, 28) is formed from a material having elastic properties.

The rotary joint may further be characterized in that an inhibiting part (17, 32) is conformed in protruding manner on one of the sliding surfaces (15, 16, 30, 31) of the first or second bearing part (3, 4, 21, 22), and lies flush with surface areas of the sliding surface (15, 16, 30, 31) of the respective other bearing part (3, 4, 21, 22).

The rotary joint may further be characterized in that the inhibiting part (17) is conformed on the inner circumferential surface of the first bearing part (3), which in certain adjustment positions corresponds in positive locking manner with at least one groove-like recess (18, 19) on the outer circumferential surface of the second bearing part (4).

The rotary joint may further be characterized in that the inhibiting part (32) is formed on the outer circumferential surface of the second bearing part (22), wherein the inhibiting part (32) protrudes in at least one opening (33) on one of the bearing shells (23, 24), wherein the opening (33) is divided into areas that define predetermined adjustment positions by at least one complementary element (34) that is to be passed by the inhibiting part (32).

The rotary joint may further be characterized in that the first bearing part (3, 21) is a two-part locating bushing, and the second bearing part (4, 22) is designed as a tubular body that is mounted so as to be rotatable the locating bushing.

Another embodiment of the present disclosure relates to a seat, particularly a vehicle seat, having at least one seat portion that is mounted so as to be movable, such as a seat cushion or the like, which is mounted by at least one rotary joint so as to be rotatable. The seat is characterized in that the rotary joint (2, 20) is a rotary joint.

In a rotary joint for a movably mounted component, in particular for a seat cushion of a vehicle rear seat having at least two bearing parts rotatably mounted with respect to each other and comprising two sliding surfaces facing each other, it is provided according to the invention that a first bearing part comprises at least two bearing shells with a variable space therebetween, by means of which the periphery of the second bearing part is at least partially enclosed, and that at least one means for increasing the contact pressing force between the sliding surfaces of the bearing shells and the sliding surfaces of the second bearing part is allocated to at least one of the bearing parts.

A rotary joint constructed in such manner according to the invention enables a connection to be made between at least surface sections of the sliding surfaces preferably without any gaps and thus also without play, and thus advantageously to minimise possible movements and noise resulting therefrom. Even unintended and automatic twisting movements of the bearing parts relative to one another may thus be reliably avoided, since the friction generated between the sliding surfaces of the bearing parts functions as a kind of locking mechanism for the bearing parts relative to each other. The second, particularly rotary bearing part is preferably clamped between the two bearing shells with a variable space therebetween of the first, fixed bearing part. The means for increasing the contact pressing force between the sliding surfaces of the bearing parts may be in the form of a screw connection for example, by means of which the bearing shells of the first bearing part are drawn together on one side. At the same time, the bearing shells of the first bearing part are preferably retained relative to one another on the opposite side in hinged manner along a swivel and folding plane.

According to an advantageous development of the invention, it is provided that at least portions of one of the sliding surfaces of the first or second bearing part are constructed from a separate sleeve element having an inner and outer diameter that match the dimensions of the bearing parts. The sleeve portion, which may be in the form of a hollow cylinder having a mesh-like structure, for example, may advantageously serve to ensure a complete absence of gaps between the two bearing parts that are mounted so as to be rotatable relative to one another over practically the entire outer and inner sliding surfaces thereof. Consequently, the clamping action is also advantageously distributed over the entire circumference of the rotary joint according to the invention, which in turn also improves the frictional lock between the sliding surfaces of the bearing parts. The second bearing part moves inside the first bearing member only after it has overcome an optionally predefinable friction resistance. In order to be able to ensure optimum absence of a gap between the sliding surfaces of the first and second bearing parts, the inner and outer diameters of the sleeve element are matched precisely to the dimensions of the bearing parts. The sleeve element also has a correspondingly favourable coefficient of friction.

The sleeve element is preferably constructed from two pre-formed shell halves, which represents an advantageous capability of the structural configuration of the sleeve member. Particularly if a sleeve member is made from non-deformable material, the shell halves thereof can be positioned around the outer circumferential surface of the second, inner bearing part relatively easily by splitting the sleeve element in two. The sleeve halves, which preferably have a solid surface, may then be arranged together with the second bearing part between the at least foldable bearing shells of the first bearing part. In order to create a rotationally fixed connection between the outer circumferential surface of the sleeve member and the inner circumferential surface of the first bearing part, for example, and thus ensure that rotation is only possible between the sleeve element and the second, inner bearing part, it may be provided that pin-like protrusions are conformed on the outer circumferential surface of the sleeve element, which correspondingly engage positively in recesses provided for this purpose on the inner circumferential surfaces of the bearing shells.

The sleeve halves are connected to each other particularly via a hinged connecting area, by means of which an advantageous alignment of the sleeve halves relative to each other is ensured. Specifically, this makes it easy to place the sleeve element around the outer circumferential surface of the first bearing part and to insert the sleeve element together with the second bearing part between the bearing shells of the first bearing member. The hinged connecting area is preferably configured as a film hinge, which is a structurally simple way to design a hinge. The film hinge is advantageously used to make the sleeve element a single part, since both sleeve halves, which are still designed to be foldable toward one another, are connected to one another by a relatively thin-walled connecting area made from the same material. On the side opposite the hinge-type connecting area, each sleeve half preferably comprises a radially protruding retaining leg that is constructed as a single part with the sleeve half. The retaining legs are arranged so as to be parallel and one on top of the other when the sleeve element is installed, and are fixed so as to lock the sleeve element between predefined areas of the bearing shells.

The material for the sleeve element is particularly made from a material having elastic properties, so that the production of the sleeve element is simplified advantageously. Also, using an elastic material makes it possible to construct the sleeve element with a certain excess size. In this regard, the sleeve element has a wall thickness that is greater than the dimension of the gap between the actual sliding surfaces of the first and second bearing part, so that the sleeve element is elastically compressed during assembly. In particular, plastic that can be moulded into the desired shape relatively easily, in an injection moulding process for example, may be used as the material for making the sleeve element. The use of other materials, such as rubber, is also conceivable.

Alternatively, or optionally, according to a development of the invention it may be provided that an inhibiting part is conformed on one of the sliding surface of the first or second bearing part, and lies flush with areas of the sliding surface of the other bearing part in each case. This deformable inhibiting part may be used to create a contact pressing force between predetermined sections of the sliding surface of the first and second bearing parts either in addition to or instead of the sleeve element. In this context, the inhibiting part particularly extends only over a predetermined portion of the sliding surface of the respective bearing part. The inhibiting part conformed according to the present invention may specifically be used together with a sleeve element that is already in use to further increase the contact pressing force on sections of the sliding surfaces. In this context, it may be necessary for the inhibiting part to be deformable, and for this reason it is ideally also made from a material with elastic properties.

The inhibiting part may be conformed for example on the inner circumferential surface of the first, outer bearing part, which in certain adjustment positions corresponds in positive locking manner with at least one groove-like recess on the outer circumferential surface of the second bearing part. With respect to the recesses, particularly on the outer circumferential surface of the second bearing part, the inhibiting part assumes a predisposed position or emplacement, which are particularly end positions both of the seat cushion in the horizontal or vertical position and at the same time of the second, rotatable bearing part. The inhibiting part on the inner circumferential surface of the first bearing part is conformed for example as a deformable thickening of material or a bead, for example. If either the inner, second or the outer, first bearing part is rotated, the thickened section can only be moved out of the recess to which it is assigned when a correspondingly high displacing force is applied to the rotatably mounted bearing part. Then, the inhibiting part undergoes a deformation process and is compressed forcefully between the sliding surfaces of the bearing parts until the other end position is reached, for example in the form of a recess on the second bearing part, in which the inhibiting part is able to expand again. The inhibiting part is preferably provided on the inner circumferential surface of the sleeve element that forms the sliding surface of the first bearing part, advantageously simplifying the conformation of the inhibiting part directly on one sliding surface.

Alternatively, it is provided that the inhibiting part is conformed on the outer circumferential surface of the second, inner bearing part, wherein the inhibiting part projects outwardly at least in an opening on one of the bearing shells, wherein the opening is divided into areas that determine preset adjustment positions by at least one complementary element through which the inhibiting part must pass. In this embodiment, the inhibiting part may be conformed integrally with the outer circumferential surface of the second bearing part, on that the inhibiting part has an advantageously fixed connection to the second, inner bearing part. In this case, the complementary part to be passed by the inhibiting part, which is arranged in the area of the opening on one of the bearing shells of the first bearing part, may be constructed as a deformable spring. It is also conceivable to construct the inhibiting part itself as a flexible plastic or rubber part that conforms on the outer circumferential surface of the second bearing part and is connected thereto. In this context, the complementary part to be passed may be a rigid material web or section of the respective bearing shell.

The first bearing part is preferably a two-part locating bushing, and the second part has the form of a tubular body that is mounted rotatably in the locating bushing. With the design of the bearing parts according to this variation, a structurally simple assembly is assured that also ensures an advantageous adjustment capability for the movably mounted component that may be connected directly to the tubular body, such as a seat cushion of a vehicle seat. The two-part locating bushing may be a fixed part of the vehicle body or of the vehicle seat. It is also conceivable to construct the inner bearing part, in the form of a tubular body, as a fixed element or to connect it rigidly to elements of the bodywork, on that the first, outer bearing part is mounted rotatably. In this regard, the bearing shells of the bearing bushing are then conformed directly on the component that is to be moved, particularly the seat cushion of a rear seat.

In a seat, particularly a vehicle seat having at least one movably mounted seat section, such as a seat cushion or the like, which is retained so as to be pivotable by at least one rotary joint, for which separate protection is requested, it is provided according to the invention that the rotary joint is a rotary joint according to any one of claims 1-9.

The use of such a rotary joint according to the invention has the advantage that the movably mounted seat portion is preferably supported in its mounting without play, so that vibrations in the rotary bearing and the noises resulting therefrom are reduced or ideally prevented entirely. Further, undesirable movement of a seat cushion of a seat that has been folded into the vertical position is at least minimized by the locking effect of the rotary joint, particularly on poor roads.

BRIEF DESCRIPTION OF THE FIGURES

Embodiments of the invention, from which other inventive features may be deduced, are shown in the drawings. In the drawings.

DETAILED DESCRIPTION

Figure 1:
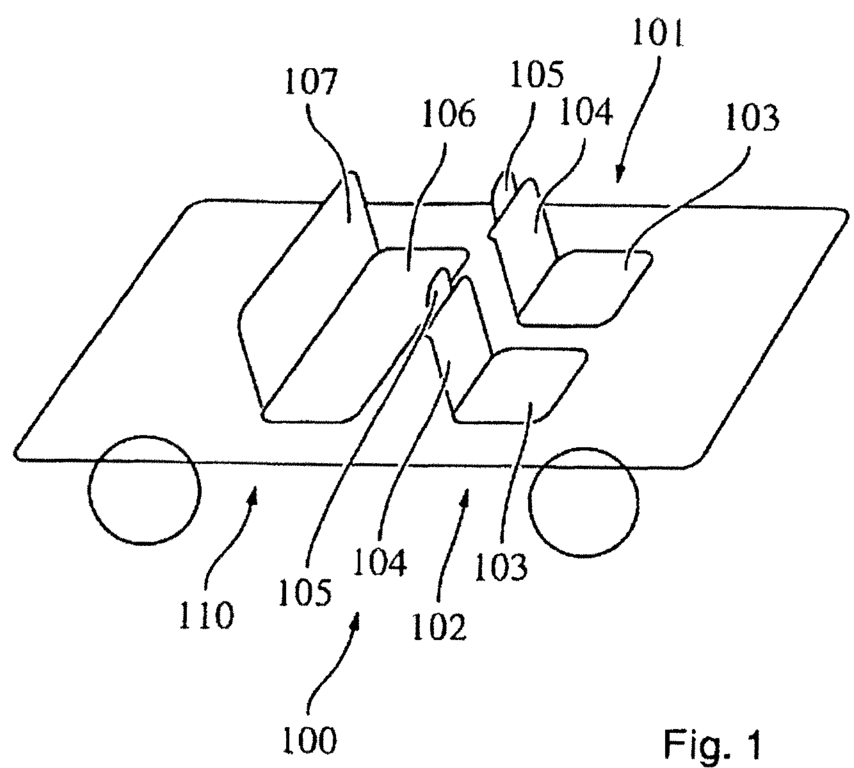
FIG. 1 is a diagrammatic view of a vehicle with a driver's seat, a passenger seat and a rear seat.

FIG. 1 is a schematic representation of a motor vehicle 100. The vehicle has a driver's seat 101, a front passenger seat 102 and a rear bench seat 110. The front seats have seat cushions 103, backrests 104 and headrest 105, and the rear seat has a seat cushion 106 and backrest 107. The angle between seat surface 103 and backrest 104 is typically adjustable. The rotary joint described in greater detail in the following is particularly suitable for adjusting the angle between seat cushion 106 and vehicle 100.

Figure 2:
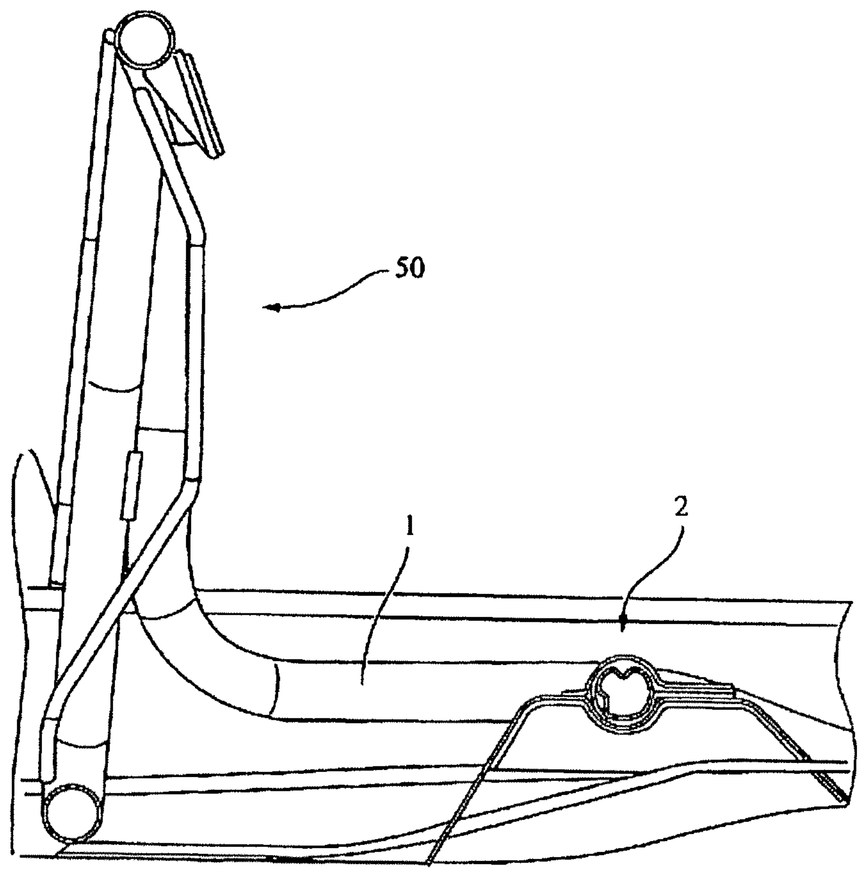
FIG. 2 is a view of a component mounted rotatably about a rotary joint according to the invention.

FIG. 2 indicates a pivoting component 1 that is mounted pivotably via rotary joint 2 at one of the ends thereof. Pivoting component 1 is part of a frame structure 50 of a seat cushion 106 of a rear bench seat 110 shown in FIG. 1, which may be pivoted back and forth between at least two adjustment positions as necessary.

Figure 3:
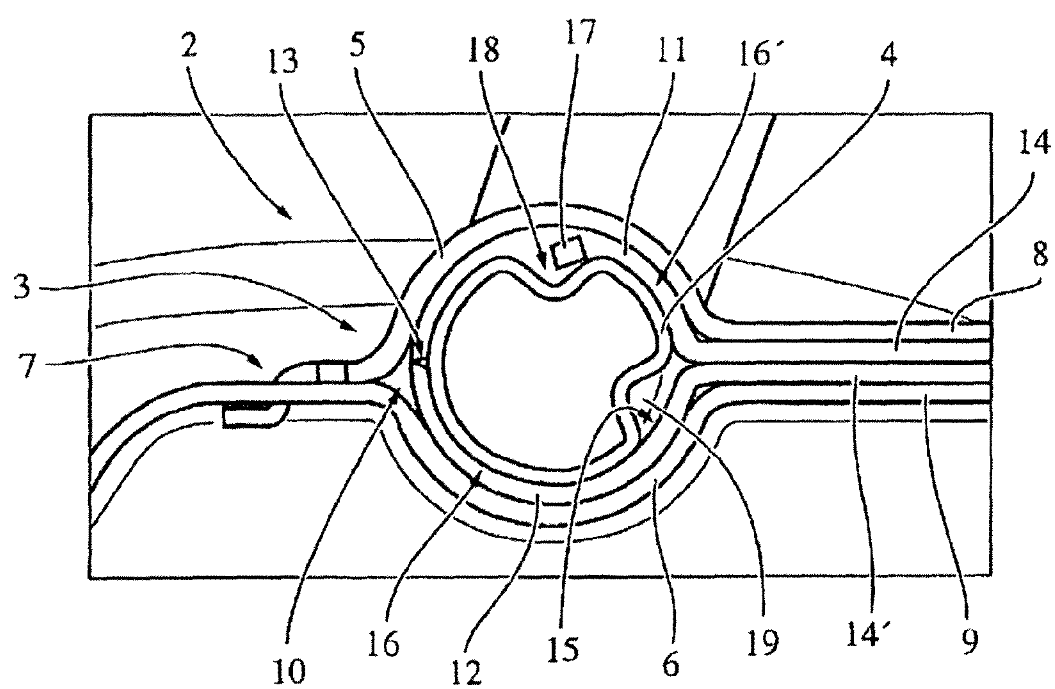
FIG. 3 is an enlarged view of the rotary joint of FIG. 2, in cross section transverse to the axis of rotation.

FIG. 3 is an enlarged view of the first embodiment of a rotary joint 2 shown in cross section. Rotary joint 2 is created from at least a first, outer bearing part 3 and a second, inner bearing part 4. First bearing part 3 has two bearing shells 5, 6 which are coupled to one another on one side via a hinge-like connecting section 7, and are equipped on the opposite side with two supporting legs 8, 9, which are connected to one another via a screw connection that is not shown. Half-shells 5, 6 may be pressed together and the contact pressing force of the bearing parts against one another may be increased with the aid of supporting legs 8, 9. A sleeve element 10 is arranged between first and second bearing parts 3, 4 in order to increase the contact pressing force between bearing parts 3, 4 made from two preformed half-shells 11, 12. Sleeve halves 11, 12 are connected to one another via a film hinge 13 and have two retaining legs at the opposite longitudinal sides thereof, two retaining limbs 14, 14', which are clamped between supporting legs 8, 9 of first bearing part 3. Sleeve element 10 is thus retained in non-rotating manner between bearing shells 5, 6 and in particular forms sliding surface 15 for sliding surface 16 of second bearing part 4. In addition, a thicker material section or bead is provided as an inhibiting part 17 on sliding surface 15 of sleeve element 10, which inhibiting part corresponds with a respective, groove-like recess 18, 19 on the outer circumferential surface of second bearing part 4.

Figure 4:
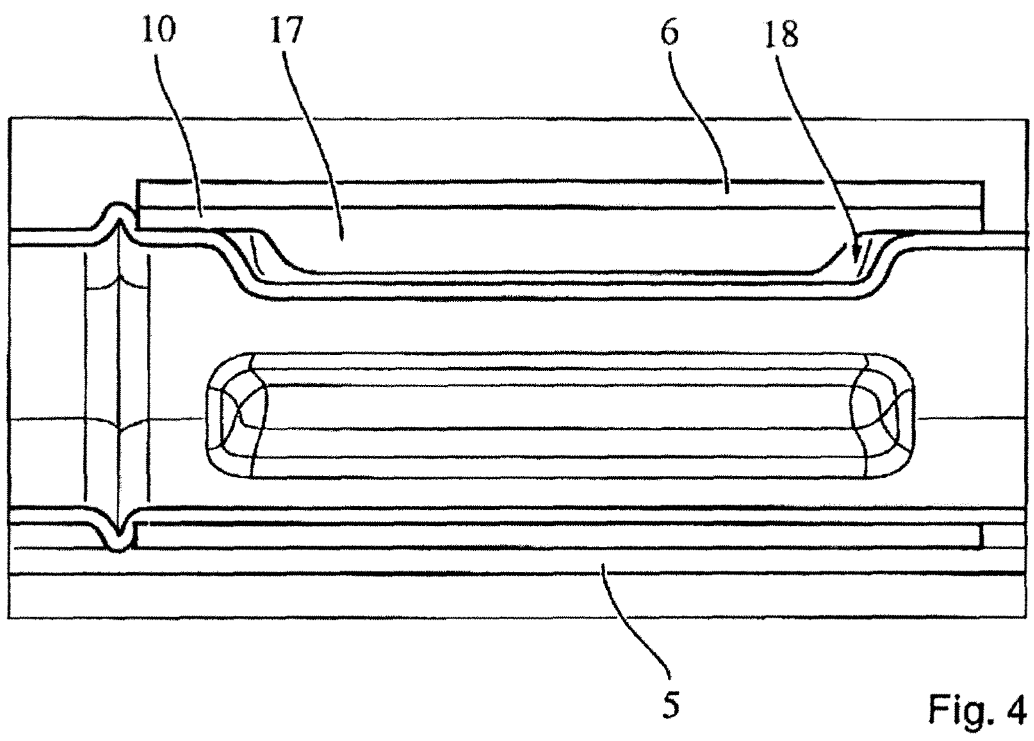
FIG. 4 is a sectional view of the rotary joint in the axis of rotation thereof.

FIG. 4 is across-sectional view of rotary joint 2 parallel to the axis of rotation thereof, which further clarifies the structure of rotary joint 2. Inhibiting part 17 extends over a predetermined section parallel to the longitudinal axis of sleeve element 10, thereby advantageously ensuring that second bearing part 4 is permanently locked securely, and therewith also rotatable component 1 in a respective adjustment position. A predetermined adjusting force is necessary to rotate second bearing part 4, wherein inhibiting part 17 is then moved out of recess 18 and at the same time is compressed or pressed together by sliding surface section 16' having the original dimensions of bearing part 4 (FIG. 3) until component 1 has been displaced so far that inhibiting part 17 is able to expand again in the other recess 19.

Figure 5:
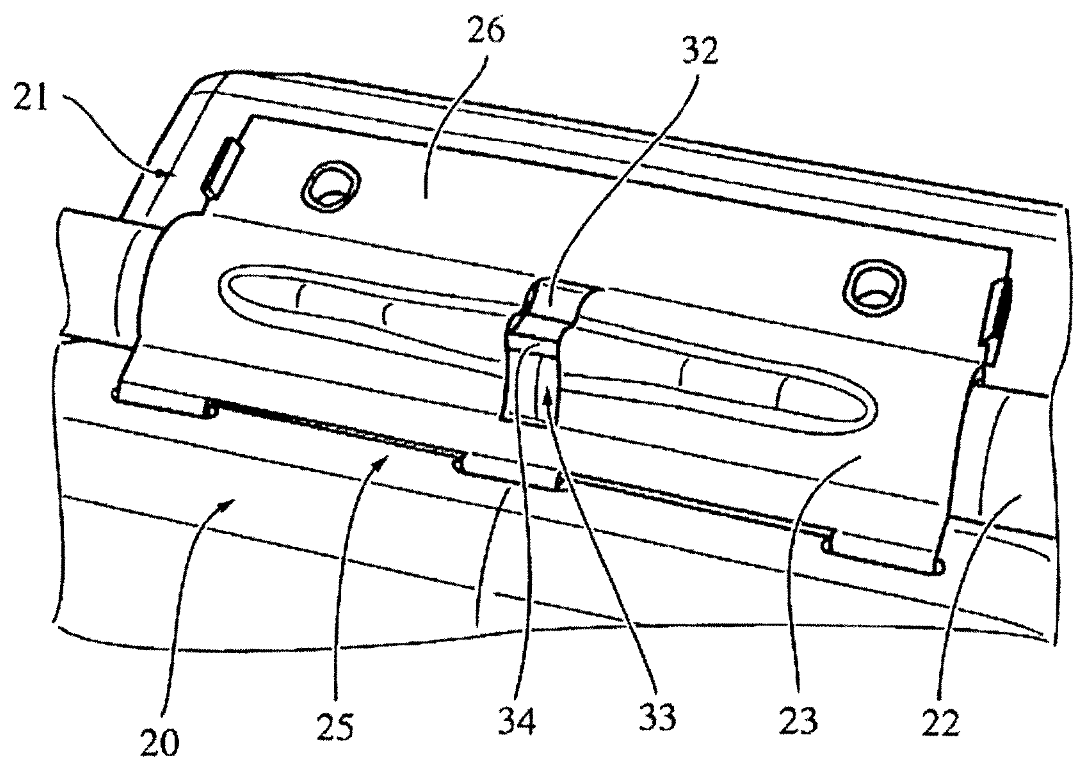
FIG. 5 is a perspective view of another embodiment of a rotary joint according to the invention.
Figure 6:
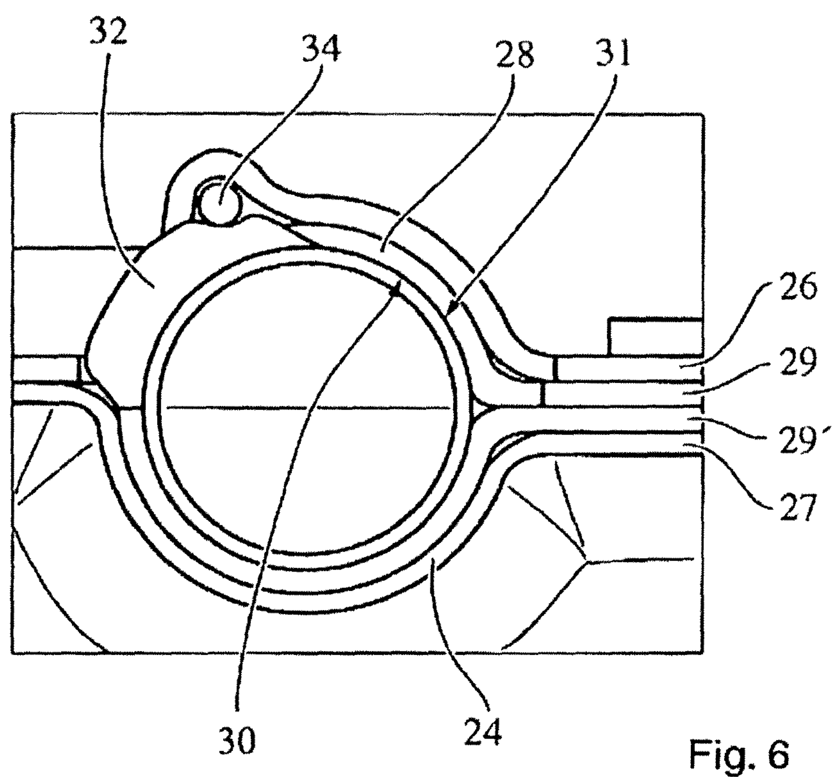
FIG. 6 is a view of the rotary joint of FIG. 5 in cross section transverse to the axis of rotation of the rotary joint.

FIGS. 5 and 6 show another alternative embodiment of a rotary joint 20 according to the invention, which also comprises two bearing parts 21, 22 that are rotatable with respect to one another. Bearing part 21 in turn has two bearing shells 23, 24 that, similarly to the first embodiment, are connected to one another on one side via a hinge-like connection area 25 and kept at a predetermined distance from one another at the opposite end by two support legs 26, 27, which are connected to each other via screw connections (not shown). Again, a sleeve element 28 is provided on the inside of bearing shells 23, 24. In a similar manner to that described in FIGS. 3 and 4, sleeve element 28 may comprise two sleeve halves (not shown in detail), which are clamped in rotationally fixed manner with their retaining legs 29, 29' between bearing shells 23, 24. Further increased tension or contact pressing force is created between sliding surfaces 30, 31 by sleeve element 28, so that bearing part 22, which is in the form of a tubular element 22 can only be rotated with increased force. In this embodiment, inhibiting part 32 is arranged directly on the outer circumferential surface of bearing part 22 and projects outwardly, wherein inhibiting part 32 protrudes into an opening 33 in bearing shell 23. Opening 33 is in particular provided with a complementary part 34 that is to be passed by inhibiting part 32, which complementary part divides the opening into at least two areas allocated to the adjustment positions. Complementary part 34, which is constructed for example as a partially deformable spring element blocks inhibiting part 32 in the adjustment position for example up to a predefinable maximum force. If the force acting on the rotatable bearing part and thus also on the rotatable bearing part exceeds said corresponding maximum value, a rotation is initiated inside rotary joint 20 and rotatable bearing part 22 is rotated to the other adjustment position.

What is claimed is:

1. A rotary joint for a vehicle seat movable between at least two positions, comprising:

an outer bearing comprising two separate shell halves that together define a rounded space, wherein, when the two shell halves are forced together by a mechanical fastener, the two shell halves decrease the rounded space between the two shell halves;

an inner bearing held between the two shell halves within the rounded space and rotatable relative to the outer bearing via rotation within the shell halves, the inner bearing comprising a sleeve forming an outer surface of the inner bearing and having an elastic property to reduce non-rotational movement between the outer bearing and the inner bearing, wherein each individual one of the two shell halves only partly surrounds a periphery of the inner bearing, wherein the two shell halves together completely surround the periphery of the inner bearing; and an inhibiting part protruding from an inner surface of the outer bearing radially inwardly toward the inner bearing, wherein the inhibiting part selectively provides resistance to the rotation of the inner bearing.

2. The rotary joint of claim 1, wherein the outer diameter of the inner bearing is sized to fit within the inner diameter of the outer bearing when the two shell halves are pressed together.

3. The rotary joint of claim 2, wherein the sleeve adds diameter to the inner bearing such that the sleeve is at least partially elastically compressed when the two shell halves are brought together.

4. The rotary joint of claim 3, wherein the sleeve comprises two sleeve halves.

5. The rotary joint of claim 4, wherein the sleeve halves are connected to via a hinge and fit around the inner bearing.

6. The rotary joint of claim 5, wherein the hinge comprises a thin section of the material of the sleeve.

7. The rotary joint of claim 1, wherein the sleeve is plastic and constructed via an injection molding process.

8. The rotary joint of claim 1, wherein the sleeve is rubber.

9. The rotary joint of claim 1, wherein the inhibiting part fits within an indent in the outer surface of the inner bearing to resistively hold the inner bearing in a first position.

* * * * *